United States Patent [19]

Fajt

[11] 4,434,886

[45] Mar. 6, 1984

[54] APPARATUS AND METHODS FOR POSITIONING ELECTRICAL COMPONENTS

[75] Inventor: John Fajt, Wynnewood, Okla.

[73] Assignee: Xenell Corporation, Wynnewood, Okla.

[21] Appl. No.: 186,446

[22] Filed: Sep. 12, 1980

[51] Int. Cl.³ .................... B65G 39/10; B65G 47/24
[52] U.S. Cl. .................................. 198/389; 198/786
[58] Field of Search ............. 198/389, 394, 624, 383, 198/786; 209/667, 673, 545; 53/591, 594; 221/307

[56] References Cited

U.S. PATENT DOCUMENTS

| | | |
|---|---|---|
| 477,093 | 6/1892 | Wead . |
| 654,281 | 7/1900 | Richards .................... 209/668 |
| 2,219,809 | 10/1940 | Davis ........................ 99/550 |
| 2,776,037 | 1/1957 | Baigent . |
| 2,877,680 | 3/1959 | Brown ....................... 221/171 X |
| 2,911,088 | 11/1959 | Ingham, Jr. et al. ......... 198/633 X |
| 3,101,866 | 8/1963 | Anderson . |
| 3,126,087 | 3/1964 | Anderson . |
| 3,144,889 | 8/1964 | Cole . |
| 3,195,584 | 7/1965 | Zimmerman et al. . |
| 3,220,443 | 11/1965 | Smith ....................... 198/383 |
| 3,225,797 | 12/1965 | Stoody . |
| 3,297,130 | 1/1967 | Greck . |
| 3,321,606 | 5/1967 | Cropp et al. . |
| 3,365,048 | 1/1968 | Ehrlich et al. . |
| 3,396,758 | 8/1968 | Hall . |
| 3,426,881 | 2/1969 | Dwyer ...................... 198/396 X |
| 3,567,006 | 3/1971 | Bell et al. . |
| 3,675,755 | 7/1972 | Hopwood-Jones . |
| 3,687,263 | 8/1972 | Randrup . |
| 3,815,730 | 6/1974 | Zwiep et al. . |
| 3,935,773 | 2/1976 | Daebler . |
| 4,094,410 | 6/1978 | Fegley et al. . |

FOREIGN PATENT DOCUMENTS 52-29078   3/1977   Japan .................................. 198/389
197706   5/1967   U.S.S.R. .

Primary Examiner—John J. Love
Assistant Examiner—Paul A. Sobel
Attorney, Agent, or Firm—Laney, Dougherty, Hessin & Beavers

[57] ABSTRACT

An electrical component positioning apparatus includes a frame with first and second substantially horizontally extending conically tapered rollers rotatably mounted upon the frame. Edges of the first and second rollers closest to each other are arranged parallel to each other and spaced apart so that said electrical components may be received between the rollers and may be engaged with and supported by both of the rollers. This apparatus mechanically positions in sequence at a predetermined position a plurality of electrical components of the type having a body with first and second lead wires extending therefrom. The predetermined position includes a predetermined location in space and a predetermined angular orientation so that the wires extend downward from the body of the electrical components and are spaced apart in a direction parallel to a predetermined horizontal line.

1 Claim, 8 Drawing Figures

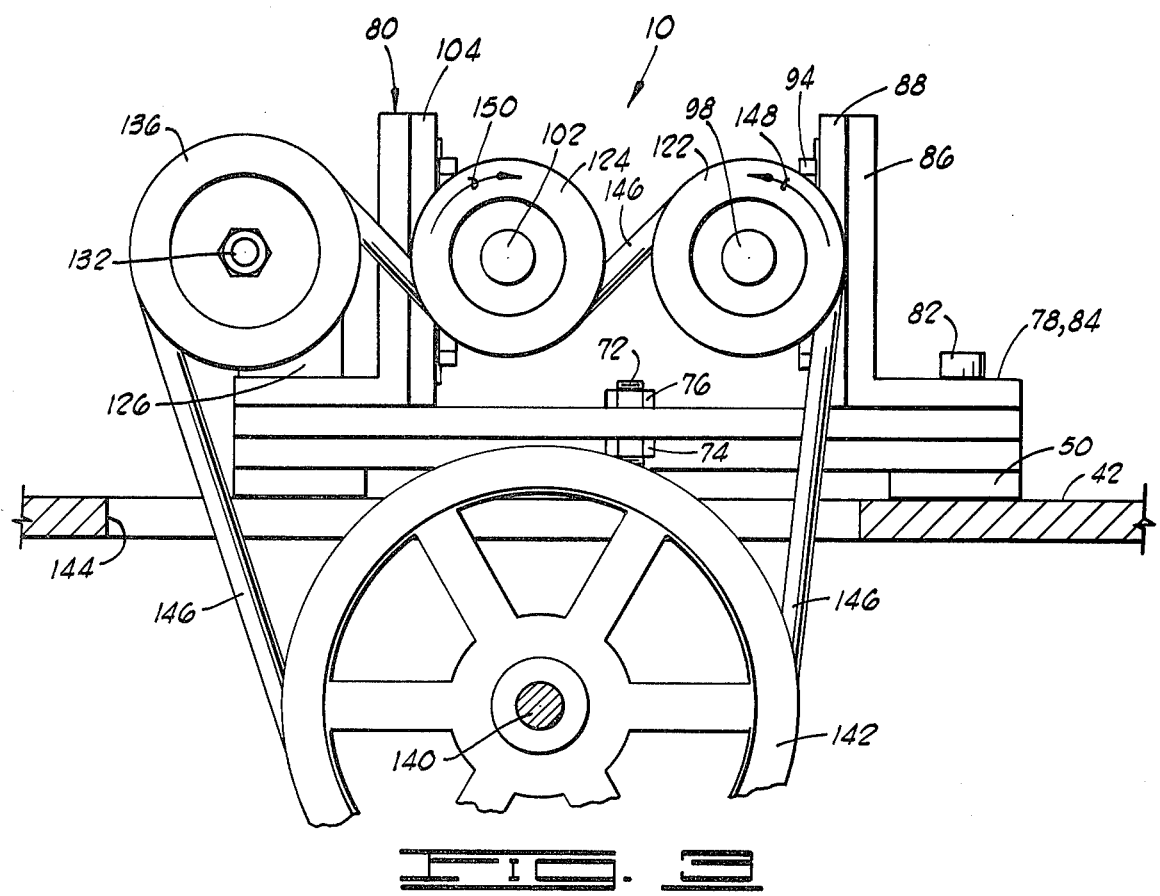
FIG. 3
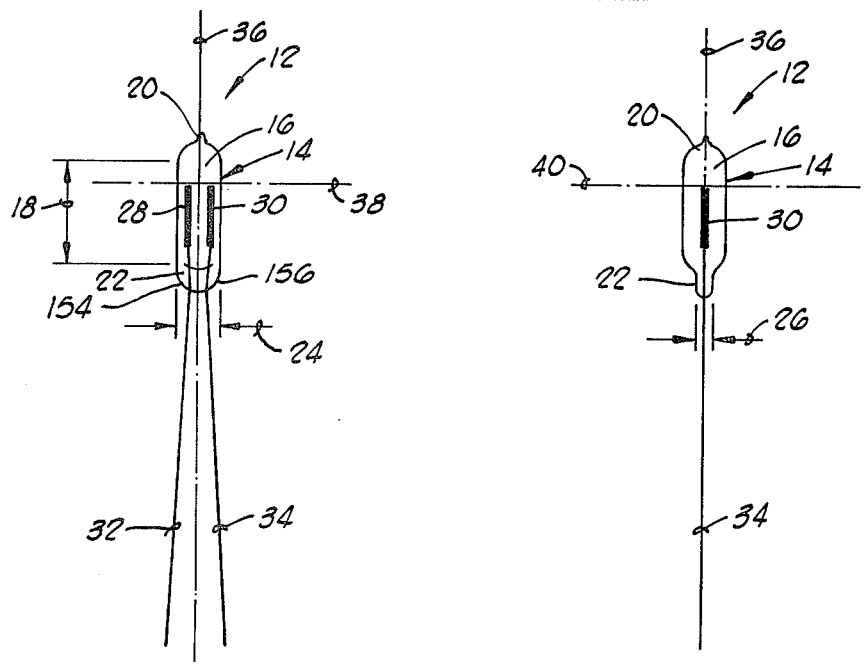
FIG. 4
FIG. 5

APPARATUS AND METHODS FOR POSITIONING ELECTRICAL COMPONENTS

BACKGROUND OF THE INVENTION

1. Brief Description of the Invention

The present invention relates generally to apparatus and methods for handling electrical components, and more particularly, but not by way of limitation, to apparatus and methods for handling negative glow lamps.

2. Description of the Prior Art

A negative glow lamp is an electrical component having a cylindrical glass bulb approximately ½" in length and ¼" in diameter. Extending downwardly from the bulb is a lower bulb portion which is a substantially flat tab formed during the bulb manufacturing process. This lower bulb portion extends downward approximately ¼" and has a width of approximately ¼", and a thickness of approximately 1/16". Disposed within the bulb are first and second filaments. Attached to the first and second filaments and extending downwardly from the lower bulb portion are first and second copper lead wires having a length of approximately 1½". These lead wires are substantially parallel and lie substantially in the plane of the flat tab extending down from the bulb.

Such negative glow lamps are used in large numbers by manufacturers of electrical equipment. Various modifications are often made to the lamps such as custom trimming of the lead wires to a specific length and/or the welding of a resistor to one of the lead wires.

Prior art methods of handling such negative glow lamps during the processes of testing the glow lamps, trimming the lead wires on the glow lamps, and/or welding resistors to the glow lamps, have involved the manual handling of each individual lamp at numerous stages in the processes. This adds greatly to the expense of manufacturing the finished lamps.

In order to automate these processes, it is necessary to provide a means for initially positioning each of the lamps at a specific predetermined location in space with a specific predetermined angular orientation so that each lamp may be received by an automated handling system in an identical manner thereby allowing the development of automated equipment for later separating, trimming and otherwise manipulating the lead wires of the lamp.

The present invention provides apparatus and methods for achieving such positioning.

SUMMARY OF THE INVENTION

First and second substantially horizontally extending conically tapered rollers are rotatably mounted upon a frame with edges of said rollers closest to each other arranged parallel to each other and spaced apart so that electrical components may be received therebetween and may be engaged with and supported by both of said rollers. This structure provides apparatus and methods for mechanically positioning in sequence at a predetermined position, a plurality of electrical components of the type having a body with first and second lead wires extending therefrom. The predetermined position includes a predetermined location in space and a predetermined angular orientation so that the lead wires extend downward from the body of the electrical component and are spaced apart in a direction parallel to a predetermined horizontal line extending parallel to the inner edges of the rollers.

It is, therefore, a general object of the present invention to provide improved apparatus and methods for handling electrical components.

Another object of the present invention is the provision of improved apparatus and methods for handling negative glow lamps.

And another object of the present invention is the provision of a pair of rotating tapered conical rollers for orienting and locating electrical components.

Yet another object of the present invention is the provision of apparatus and methods for vertically orienting negative glow lamps.

Other and further objects, features and advantages of the present invention will be readily apparent to those skilled in the art upon a reading of the following disclosure when taken in conjunction with the accompanying drawings.

BRIEF DESCRIPTION OF THE DRAWINGS

FIG. 3 is a rear elevation view of the apparatus of FIGS. 1 and 2 taken along line 3—3 of FIG. 2.

FIG. 4 is a side elevation view of a negative glow lamp with the plane of the paper being defined by the first and second body axes of the negative glow lamp.

FIG. 5 is a side elevation view of the negative glow lamp of FIG. 4, rotated 90°, clockwise as viewed from above about its first body axis, so that the plane of the paper is defined by the first and third body axes of the negative glow lamp.

DETAILED DESCRIPTION OF THE PREFERRED EMBODIMENTS

Figure 1:
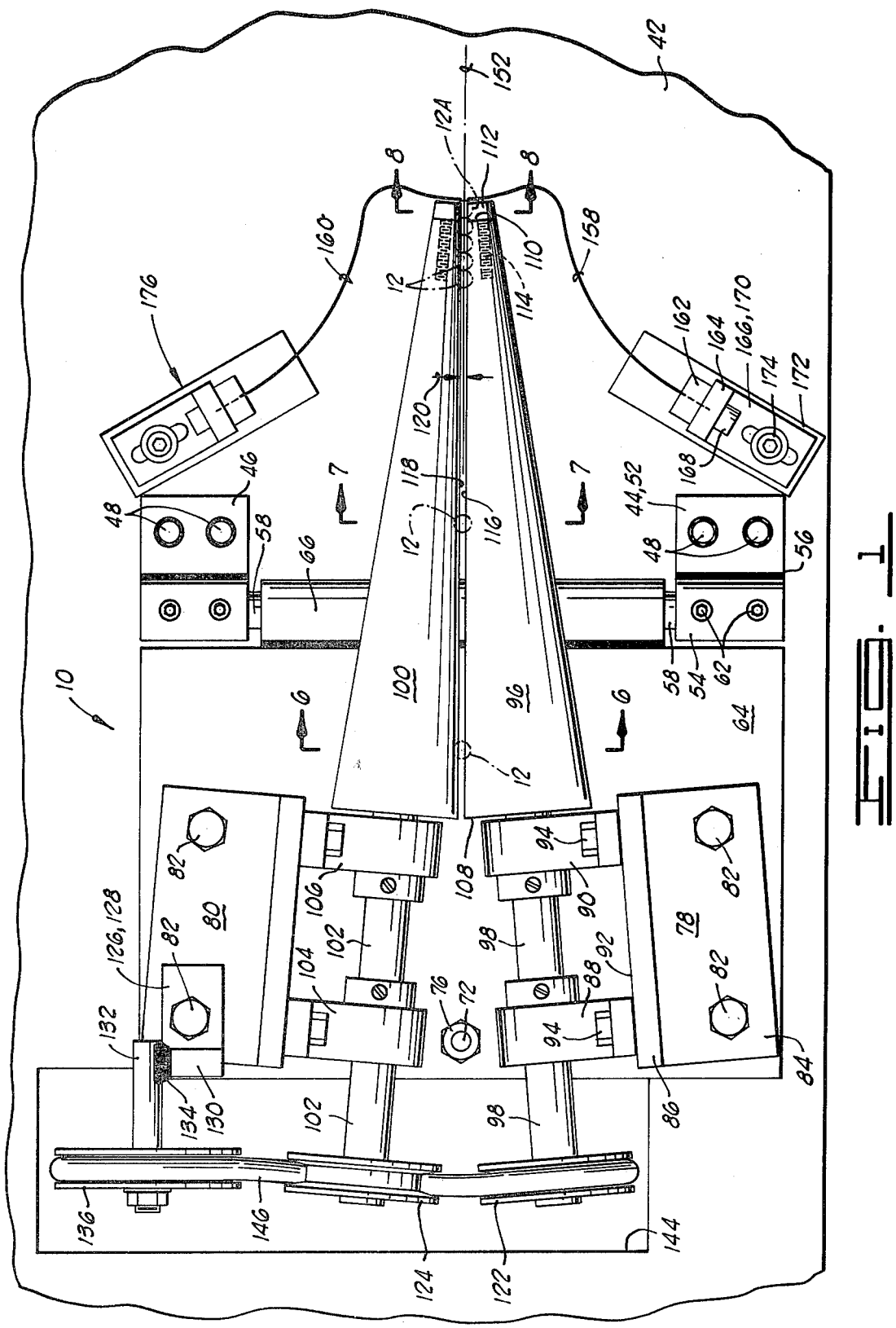
FIG. 1 is a plan view of the lamp positioning roller assembly.
Figure 2:
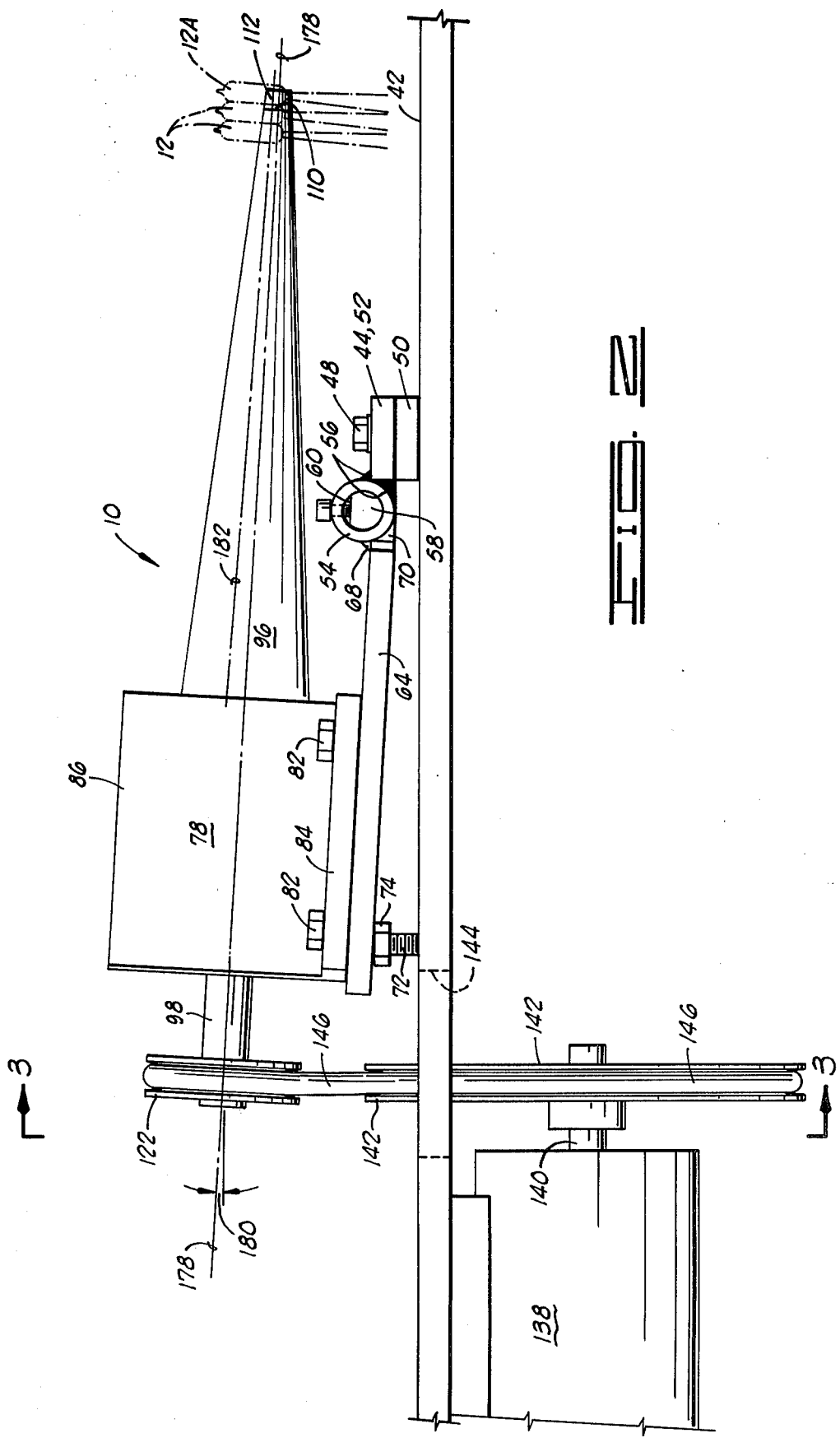
FIG. 2 is a side elevation view of the apparatus of FIG. 1.

Referring now to FIGS. 1 and 2, the lamp positioning roller assembly, which may generally be referred to as a system for positioning negative glow lamps, is shown and generally designated by the numeral 10.

Referring to FIGS. 4 and 5, a negative glow lamp 12 is thereshown. The negative glow lamp 12, which itself is well known in the prior art, will now be described for purposes of reference. The negative glow lamp 12 includes a bulb 14. The bulb 14 has a cylindrical portion 16 having a length 18 of approximately ½". The cylindrical portion 16 has an outside diameter, which is its greatest minimum cross sectional dimension, of approximately ¼". It will be understood that for any section cut through the bulb 14 perpendicular to its longitudinal axis there will be a minimum cross sectional dimension. The greatest of these minimum cross sectional dimensions determines the smallest width of a slot through which the bulb 14 could pass.

At the upper end of cylindrical part 16 is a roughly conical closed tip 20 which is formed during the bulb manufacturing process.

Extending downward from the lower end of cylindrical part 16 is a flat bottom bulb portion 22 which closes the bottom of hollow cylindrical part 16. Flat bottom bulb portion 22 has a width 24 of approximately ¼" and has a thickness 26, as can best be seen in FIG. 5, of approximately 1/16".

Received within bulb 14 are first and second filaments 28 and 30. The filaments 28 and 30 are substantially parallel and spaced apart as can be seen in FIG. 4. Attached to filaments 28 and 30 are first and second lead wires 32 and 34 which extend therefrom downward through the flat bulb portion 22. Lead wires 32 and 34 extend downward a length of approximately 1½" below bulb 14. The lead wires 32 and 34 are encased in lower part 22 of bulb 14 where they pass therethrough and are substantially parallel to each other and lie within the plane of filaments 28 and 30 and the plane of lower bulb portion 22. It will be understood by those skilled in the art, that the lead wires 32 and 34 will, of course, often be slightly bent away from each other or out of the plane of FIG. 4. The construction of the lamp 12 is, however, such that if the lead wires 32 and 34 are not deformed, but rather extend axially from the filaments 28 and 30, they will be substantially parallel to each other and lie in the plane of flat bottom bulb portion 22 and in the plane of filaments 28 and 30.

This is further illustrated in FIG. 5, in which lamp 12 is rotated 90° about a vertical axis from the view shown in FIG. 4, so that only the second filament 30 and the second lead wire 34 are shown.

The geometric configuration of the lamp 12 may best be described by defining first, second and third mutual perpendicular body axes of the lamp 12. Those axes, which will be understood as being imaginary axes, are defined as follows.

A longitudinal axis through cylindrical part 16 of lamp bulb 14 is defined as a first body axis 36. Perpendicular to axis 36 and lying within a plane defined by filaments 28 and 30 and lower flat bulb portion 22 is a second body axis 38. The axes 36 and 38 define the plane of the paper on which FIG. 4 is drawn.

A third body axis 40 is perpendicular to both said first and second axes 36 and 38 and may be seen in FIG. 5 where the axes 36 and 40 define the plane of the paper on which FIG. 5 is drawn.

As can be seen in FIG. 4, the first and second lead wires 32 and 34 extend from lower bulb portion 22 substantially parallel to first body axis 36 and spaced apart in a direction parallel to second axis 38.

Referring again to FIGS. 1 and 2, the lamp positioning roller assembly is thereshown and generally designated by the numeral 10. Roller assembly 10 is mounted upon a table frame 42. First and second roller attachment hinges 44 and 46 are attached to table frame 42 by allen screws 48. The table frame 42 is threaded and tapped to receive the allen screws 48.

Shims 50 are placed below roller attachment hinges 44 and 46 to adjust a vertical position thereof.

First roller attachment hinge 44 includes a plate portion 52 having a hollow cylindrical portion 54 welded to the back edge thereof at weld 56. Second roller attachment hinge 46 is similarly constructed.

A hinge bar 58 is received within the inner bores of first and second roller attachment hinges 44 and 46. Each end of hinge bar 58 includes a flat surface 60.

Hollow cylindrical part 54 of first roller attachment hinge 44 has two threaded holes in the upper side thereof within which are received allen screws 62 which are utilized as set screws to set against flat surface 60 of hinge bar 58 to fix hinge bar 58 relative to hollow cylindrical part 54.

A roller carrier plate 64 has a hollow cylindrical middle hinge portion 66 attached to a front edge thereof by welding as shown at 68 and 70.

Hinge bar 58 is received through the central bore of middle hinge portion 66 which is rotatable relative thereto so that roller carrier plate 64 may be rotatably adjusted about the horizontal longitudinal axis of pivot bar 58 relative to table frame 42.

An adjustment bolt 72 extends upward from table frame 42 and has lower and upper adjustment nuts 74 and 76 threadedly engaged therewith and engaging lower and upper surfaces, respectively, of roller carrier plate 64. Thus, the rotational position of carrier plate 64 about pivot bar 58 may be adjusted by rotating the nuts 74 and 76 upon the threads of adjustment bolt 72.

First and second L-shaped roller support brackets 78 and 80 are attached to roller carrier plate 64 by allen screws 82.

First support bracket 78 includes a shorter horizontal leg 84 and a longer vertical leg 86. Second support bracket 80 is similarly constructed. First and second bearing blocks 88 and 90 are attached to an inner surface 92 of vertical leg 86 of first support bracket 78 by allen screws 94.

A first substantially horizontally extending conically tapered roller 96 includes a shaft 98 extending rearwardly therefrom which is rotatably received within bearing blocks 88 and 90.

Similarly, a second roller 100 has a shaft 102 which is received within bearing blocks 104 and 106 which are attached to second support bracket 80.

In a preferred embodiment of the tapered rollers 98 and 100, the roller 98 has a rear end 108 with a diameter of 2" and has a front end 110 with a diameter of 0.380". Roller 98 has an axial length of 9⅞" between front and rear ends 110 and 108. A hardened tool steel tip insert 112 has a threaded bolt extending rearwardly thereof which is received within threaded and tapped hole 114 in front end 110 of roller 96. Tip insert 112 is tapered continuously along the profile projecting from the outer surface of roller 96.

Second roller 100 is constructed similarly to first roller 96.

As shown in FIG. 2, the innermost or closest edges 116 and 118 of rollers 96 and 100 are oriented parallel to each other and spaced apart by a distance 120 which in a preferred embodiment is ⅜".

Attached to the rear end of shafts 98 and 102 of first and second rollers 96 and 100 are first and second roller drive pulleys 122 and 124, respectively.

An L-shaped idler support bracket 126 having a horizontal leg 128 and a vertical leg 130 is attached to a second roller support bracket 80 by one of the allen screws 82. An idler stub shaft 132 is welded to the vertical leg 130 of idler support bracket 126 at weld 134. Rotatably attached to idler stub shaft 132 is an idler pulley 136.

As is best seen in FIG. 2, there is attached to the bottom of table frame 42 an electric drive motor 138. A shaft 140 extends forwardly of motor 138 and has a motor pulley 142 attached thereto.

As best seen in FIGS. 1 and 3, table frame 42 includes an elongated cut out slot 144 through which an upper portion of motor pulley 142 extends. FIG. 3 is a view along line 3—3 of FIG. 2. An endless drive belt, which preferably has a round cross section, is designated by the numeral 146. Drive belt 146 extends under motor pulley 142 then over first drive pulley 122, then under second drive pulley 124, then over idler pulley 136, then back to motor pulley 142.

In this manner, rotation of motor pulley 142 by electric drive motor 138 causes the tapered rollers 96 and 100 to rotate toward each other from above in opposite directions as indicated by arrows 148 and 150, respectively, in FIG. 3.

MANNER OF OPERATION

The manner of operation of the present invention is as follows.

A plurality of lamps 12 are placed between the rollers 96 and 100 as they are rotating in the manner previously described. These lamps are initially placed between the rollers near the larger ends thereof approximately at the location of the lamp 12 illustrated in phantom lines in FIG. 1 through which the section line 6—6 is drawn.

These lamps 12 may be fed onto the roller assembly 10 in several ways. They may, for example, be dropped on top of the rollers 96 and 100 by a conveyor, or they may be stored in a large tray mounted above the rollers and may be periodically dropped onto the rollers by hand or by hand-assisted movement down a sloped chute from the storage tray.

When the lamps 12 are initially placed on top of the rollers 96 and 100, they need not be oriented in any particular manner. The orientation is accomplished by the rotating rollers regardless of the initial orientation of the lamp 12 when it is dropped on top of the rollers 96 and 100.

As mentioned above, each of the lamps 12 includes the lamp bulb 14 having a lower bulb portion 22 extending from bulb 14 in a direction parallel to the first axis 36 of the bulb 14. The lower bulb portion 22 has a width 24 in a direction parallel to the second body axis 38 of the bulb, and has a thickness 26 less than the width 24 in a direction parallel to a third body axis 40 of the bulb. The first, second and third body axes of the bulb 14 are mutually perpendicular. The first and second lead wires 32 and 34 extend from the lower bulb portion 22 substantially parallel to the first body axis 36 and spaced apart in a direction parallel to the second axis 38.

When such a bulb is placed between the rollers 96 and 100, those rollers orient the bulb so that its first body axis 36 is vertical, with its lead wires 32 and 34 extending downward from the bulb 14, and so that its second body axis 38 is parallel to a predetermined horizontal line 152. It will be understood that once the first and second body axes are oriented, the orientation of the third body axis 40 is necessarily determined thereby. The predetermined horizontal line 152 is parallel to the innermost edges 116 and 118 of rollers 96 and 100 and lies therebetween as projected onto an imaginary horizontal surface.

This orientation is accomplished in the following manner.

When the bulb 12 is initially placed between the rollers 96 and 100 it may be in any orientation. The sliding movement of the rollers 96 and 100 relative to the glass bulb 14 overcomes any static friction between the bulb 14 and the surface of the rollers and causes the bulb 14 to seek to position itself so that it has a minimum gravitational potential energy. In other words, it will fall to the lowest level possible.

The dimensions of the rollers relative to the bulb 14 are such that the rollers contact the outer surface of cylindrical part 16, and since the end of the bulb 14 from which the lead wires 32 and 34 extend is the heaviest, with the center of gravity of the entire lamp 12 being in the area of the junction between cylindrical part 16 and flat bulb portion 22, the lead wires 32 and 34 will swing downward between the rollers 96 and 100 thereby giving the lamp 12 an orientation such that its first body axis 36 is vertically oriented with lead wires extending down from the bulb.

Since the lamp 12 can ride lower between the rollers if it is oriented with its second body axis 38 parallel to predetermined line 152 rather than having its third body axis 40 parallel to said predetermined line, and since the lower corners 154 and 156 of lower bulb part 22 are rounded as seen in FIG. 4, the bulb 12 will orient itself with its second body axis 38 parallel to predetermined line 152.

This entire orientation process takes place very quickly, on the order of one second, once the bulb is dropped between the rotating rollers.

Then the oriented bulb 12 migrates from the position through which section line 6—6 is drawn toward the small ends of the rollers. This is because the elevation at which the bulb 14 of lamp 12 contacts the rollers 96 and 100 drops as the bulb moves to the right as shown in FIG. 1. Again, the continued rotation of the rollers 96 and 100 eliminates static friction between those rollers and the bulb and thus the bulb slowly slides down toward the small end of the tapered rollers.

It is preferable that the surface of the rollers 96 and 100 be finished to at least a No. 8 glossy polish so that the glass bulbs slide freely relative thereto and are not crushed between the rollers. It will be understood that with any particular type of electrical component to be aligned by an apparatus such as that of the present invention, it is necessary that the material against which the rollers are sliding be taken into consideration and that the rollers be so constructed and finished as to provide a sufficiently low co-efficient of friction with the electrical component body to prevent the electrical components from being pulled down between the rollers and crushed.

The sloped line of engagement between the bulbs and the rollers causes the rollers to feed the bulbs to the right, as seen in FIGS. 1 and 2, towards a forwardmost position such as is represented by forwardmost bulb 12A, where the bulb is held between the roller tip inserts such as tip insert 272. Further lateral movement to the right of the forwardmost bulb 12A is prevented by a pair of spring wires 158 and 160, the ends of which engage the forwardmost bulb 12A to resiliently retain the bulb 12A from any further lateral movement to the right. Thus, the bulbs 12 will line up contacting each other, and supported against the forwardmost bulb 12A as shown in FIGS. 1 and 2, and as the forwardmost bulb 12A is removed by some means the other bulbs are sequentially fed to said predetermined position in space.

The first spring wire 158 is held in a carrier block 162 which is adjustably attached to a vertical leg 164 of an angle shaped bracket 166 by allen screw 168. A horizontal leg 170 of bracket 166 is horizontally adjustably attached to a mounting plate 172 by an allen screw 174. Mounting plate 172 is attached to table frame 42.

A second spring wire holder assembly 176 is similarly constructed and is attached to second spring wire 160.

Thus, the forwardmost lamp 12A is releasably retained at a predetermined position in space, said predetermined position including a predetermined location in space defined between the small ends of rollers 96 and 100 and laterally defined by engagement of forwardmost bulb 12A with spring wires 158 and 160, and including a predetermined orientation about each of three mutually perpendicular spatial axes so that the first body axis of the bulb 12A is oriented vertically with the second body axis of the bulb 12A oriented parallel to predetermined line 152.

Figure 6:
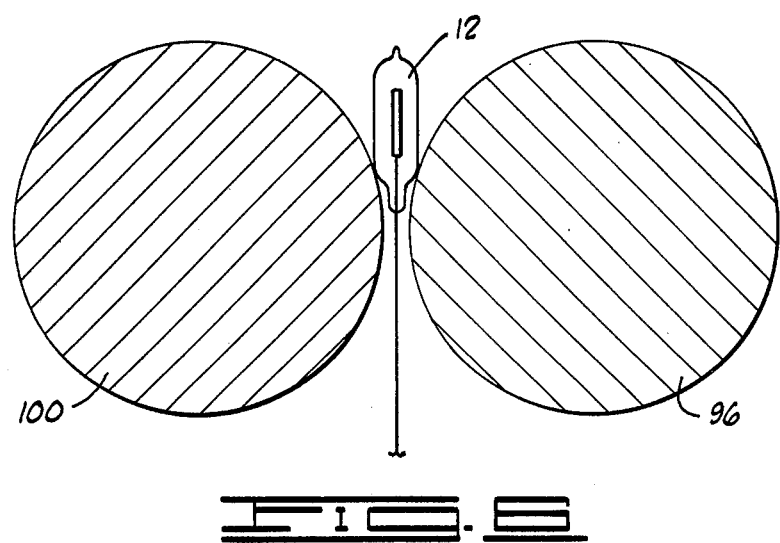
FIGS. 6, 7 and 8 are sectional views taken along lines 6—6, 7—7 and 8—8, respectively, of FIG. 1, illustrating the manner in which a negative glow lamp engages the tapered rollers at each of those locations.
Figure 7:
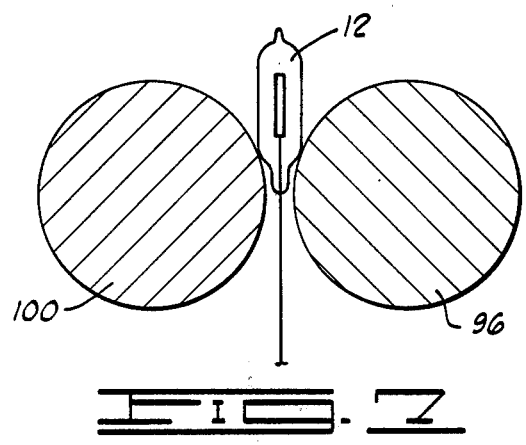
Figure 8:
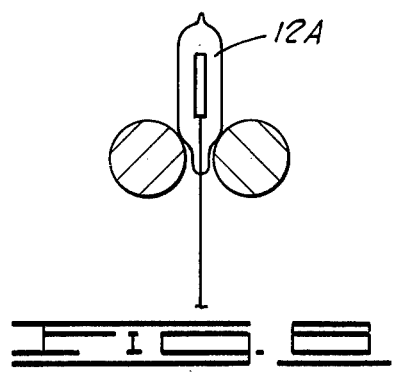

The manner in which the line of contact, between the bulbs 14 and the rollers 156 and 260, slopes downward to the right as the bulbs travel to the right, can best be understood by viewing FIGS. 2, 6, 7 and 8. FIGS. 6, 7 and 8 are section views taken along the sections indicated at FIG. 1.

As best can be seen in FIG. 2, an axis of rotation 178 of first roller 96, which in elevation is parallel to the axis of rotation of roller 100, but which in plan is not as can be seen in FIG. 1, is not horizontally oriented, but rather is tilted downward to the right at a slight angle 180 from the horizontal.

Even if the rollers 96 and 100 were cylindrical rollers, it will be appreciated that if the axis of rotation of those rollers were tilted from the horizontal, then the line of contact of the bulbs with the rollers, which line of contact would be parallel to the axis of rotation, would also be sloped and thus the bulbs could slide down the sloped roller assembly.

With the tapered rollers 96 and 100 of the present invention, another factor is introduced in that, even if the rotational axis such as axis 178 were horizontal, the line of contact between the bulbs 14 and the rollers would still be sloped "downward" toward the small end of the rollers because the bulbs are held at a higher elevation when they are near the large end of the rollers than they are when they are near the small end of the rollers. This can best be appreciated by viewing FIGS. 6, 7 and 8 which illustrate the relative position of bulb 12 as it moves to the right between the rollers 96 and 100.

The line of contact between the bulbs 12 and the roller 96 is designated as 182 in FIG. 2, and it can be seen that the line 182 is not parallel to the axis of rotation 178, but rather the axis 178 and the line 182 converge to the right.

For a given type of electrical component and a given coefficient of friction between that component and the rollers, the line of contact 182 must be sloped sufficiently so that the gravitational force acting upon the electrical components is sufficient to overcome sliding frictional resistance and then the lamps will slide down the rollers. Thus, when rollers 96 and 100 are described as "substantially horizontally extending" it will be understood that their axes of rotation need not be exactly horizontal.

For the glass bulbs 14 of lamps 12 having the dimensions previously described, and for the rollers 96 and 100 having the dimensions previously described and having a No. 8 glossy polish, it is desirable that the axis of rotation 178 be sloped approximately 7°, i.e. the angle 180 should be approximately 7°.

Adjustment bolt 72 provides a means for adjusting the degree of slope of the line of contact 182.

Another important feature provided by the conical taper of rollers 96 and 100 is that the final position of each lamp 12 is between the small ends of the rollers. This makes it much easier to then engage the lamps with a lamp receiving and holding device than it would be if the rollers were not tapered and were instead cylindrical with a diameter equal to that of large end 108. If the rollers were cylindrical with a constant diameter like small end 110, on the other hand, they would be much less effective for initially orienting the lamps. Thus tapered rollers are far superior to cylindrical rollers.

Thus it is seen that the methods and apparatus for handling electrical components of the present invention are readily adapted to achieve the ends and advantages mentioned as well as those inherent therein. While certain preferred embodiments of the present invention have been illustrated for the purpose of this disclosure, numerous changes in the arrangement and construction of parts may be made by those skilled in the art, which changes are encompassed within the scope and spirit of this invention as defined by the appended claims.

What is claimed is:

1. An automated method of handling electrical components, comprising:
   mechanically positioning in sequence at a predetermined position a plurality of electrical components of the type including:
   a body;
   a lower body portion extending from said body in a direction parallel to a first axis of said body, said lower body portion having a width in a direction parallel to a second axis of said body, and a thickness less than said width in a direction parallel to a third axis of said body, said first, second and third body axes being mutually perpendicular; and
   first and second lead wires extending from said lower body portion substantially parallel to said first body axis and spaced apart in a direction parallel to said second axis;
   said positioning step including the steps of:
   placing each of said electrical components between a pair of rotating rollers so that said body of each of said electrical components is engaged by both of said rollers and thereby orienting each of said electrical components so that said first body axis thereof is vertical, with said lead wires extending downward from said body, and so that said second body axis is parallel to a predetermined horizontal line, said rollers rotating in opposite directions and inwardly from above toward each other; and
   gravity feeding said oriented electrical components sequentially along a predetermined path between said rotating rollers toward small ends of said rotating rollers to a predetermined location in space, said rotating rollers being continuously conically tapered between a location thereon where said electrical components are initially placed and said small ends; and
   releasably retaining each of said electrical components at said predetermined position;
   said predetermined position of said electrical components being defined by said predetermined location in space, said vertical orientation of said first body axes, and said orientation of said second body axes parallel to said predetermined horizontal line.

* * * * *